United States Patent [19]

Himbury

[11] 4,365,890

[45] Dec. 28, 1982

[54] PROCESS AND APPARATUS FOR PHOTOGRAPHICALLY ENLARGING AND DEVELOPING AN IMAGE

[76] Inventor: Albert G. Himbury, 31 Camberwell Rd., London SE 5, England

[21] Appl. No.: 206,113

[22] Filed: Nov. 12, 1980

[51] Int. Cl.³ .............................................. G03B 29/00
[52] U.S. Cl. ....................................... 355/28; 355/29; 355/77
[58] Field of Search ......................... 355/27, 28, 77, 29

[56] References Cited

U.S. PATENT DOCUMENTS

| | | | |
|---|---|---|---|
| 3,218,918 | 11/1965 | Brindley et al. | 355/28 |
| 3,453,138 | 7/1969 | Chen et al. | 355/28 X |
| 3,875,861 | 4/1975 | Stackig | 355/28 X |
| 3,987,465 | 10/1976 | Sippel | 355/27 X |

FOREIGN PATENT DOCUMENTS

| | | |
|---|---|---|
| 1182303 | 2/1970 | United Kingdom . |
| 1201346 | 8/1970 | United Kingdom . |
| 1436631 | 5/1976 | United Kingdom . |

OTHER PUBLICATIONS

UK Patent Application, GB 2,002,131 A, 6-.

*Primary Examiner*—Richard A. Wintercorn
*Attorney, Agent, or Firm*—Karl W. Flocks; Sheridan Neimark

[57] ABSTRACT

In a process and apparatus for photographically enlarging an image by advancing unexposed light sensitive material from a roll of such material to an image receiving location, exposing the material at such location to an image, severing the exposed material from the roll and advancing the severed and exposed material through image activating or developing means and image stabilizing means, it is provided that the material is advanced to the image receiving location by feed rollers disposed downstream of such location and is supported at such location in a substantially vertical plane by such feed rollers. The material at the image receiving location is exposed to an enlargement of the image to be reproduced and the exposed material is advanced by the feed rollers from the image receiving location and severed from the roll after being advanced beyond the feed rollers. The severing is effected by the guillotine action of a knife edge displaced in a direction substantially normal to the general plane of the exposed material at the severing location.

10 Claims, 8 Drawing Figures

PROCESS AND APPARATUS FOR PHOTOGRAPHICALLY ENLARGING AND DEVELOPING AN IMAGE

BACKGROUND OF THE INVENTION

1. Field of the Invention

This invention relates to a process and apparatus for photographically enlarging and developing an image.

2. Description of the Prior Art

It is known photographically to reproduce an image by advancing image receptive material from a roll of such material to an image receiving location, projecting the image on to the material at such location and subsequently treating the imaged material to fix the image therein.

One such known apparatus is disclosed in U.K. patent specification No. 1,182,303 in which the material is a photosensitive sheet advanced from a roll of such material to a substantially vertical image receiving position. The material is advanced to the image receiving location from the roll by feed rolls disposed between the roll of material and the imaging receiving location, i.e., upstream of such location. In order to support the advanced material at the image receiving location it is advanced between a planar rear support plate and a transparent plate which retain the material between them at the image receiving location. The transparent plate clearly has to be free of imperfections and markings to transmit the image to the material. Following exposure, the exposed section of the photosensitive sheet is advanced upwardly between a rotary knife and anvil. The knife operates by rotation to sever the sheet to separate the exposed portion from the remainder. The exposed section of the photosensitive sheet is then advanced through a processing section in which processing liquid is applied to the exposed face of the sheet to produce a silver transfer layer on the surface of a translucent layer.

A further known form of apparatus is disclosed in U.K. patent specification No. 1,201,346 in which photosensitive material is advanced from a cassette roll of such material to a substantially horizontal imaging platen 2 which defines the imaging plane. The material is advanced from the cassette roll to the imaging platen by drive rolls located adjacent the cassette roll and between the latter and the imaging platen, i.e., upstream of the horizontal image receiving location. Cutting means is provided adjacent the cassette roll, i.e., upstream of the image receiving location to sever the exposed sheet from the roll after exposure and the severed sheet and exposed sheet is advanced to a processing location.

Another form of known apparatus is disclosed in U.K. patent specification No. 1,436,631 for electrophotographic colour copying. Paper is supplied from a roll and, after being cut into size by a cutter, is maintained horizontal at the exposure position on a transport belt means. The paper is advanced to the exposure position by feed rollers disposed between such position and the roll, i.e., upstream of the exposure position and the cutter which is also upstream of the exposure position severs the material before exposure. The paper at the exposure position is changed uniformly and then exposed to light. A developing unit moves horizontally over the paper to develop an image corresponding to the latent charged image with a first colour toner. This is repeated according to the number of colours required. The copy thus produced is then delivered to an outlet.

There is also known from U.K. patent specification published under No. 2002131A a microfilm processor for photographically recording an image on microfilm. In this apparatus, the film is advanced from a roll of film to a horizontal image receiving position by rollers disposed upstream of such position, i.e., between the image receiving location and the roll. A rotary cutter is provided adjacent to such location and operates to sever the film after a predetermined number of frames have been advanced to the image receiving location, whether or not all such frames have been exposed. The severed film is then advanced for processing.

None of the known arrangements is concerned with producing an enlarged image but in each case the material is advanced from a roll of such material by feed rollers disposed between the roll of material and the image receiving location i.e., upstream of the image receiving location so that the material is effectively pushed to that location. Such an arrangement has the disadvantage that the material is not fed under tension nor is it held under tension at the image receiving location. Such a disadvantage may not be too onerous in apparatus, such as the last three known arrangements referred to above, in which the material is supported horizontally at the image receiving location. However, such an arrangement is wasteful of floor space in apparatus intended to produce, as in the present case, an enlarged image which could be of poster size.

Only U.K. patent specification No. 1,182,303 discloses a substantially vertical image receiving position and seeks to overcome the disadvantage referred to by supporting the material at the image receiving location between a rear support plate and a front transparent window. However, apart from the disadvantages of the window, the material at the image receiving location is not in tension and, as it has to be pushed between the window and the support flat some compromise must be made between the conflicting requirements of on the one hand providing sufficient spacing between the support plate and the window to avoid or minimise friction between the material with its sensitive surface and the plate and window and, on the other hand, making this spacing sufficiently small to avoid undue sagging of the material under its own weight.

SUMMARY OF THE INVENTION

It is an object of the present invention to provide an improved process and apparatus for photographically enlarging and developing an image in which the disadvantages referred to above may be materially reduced if not entirely obviated.

It is also within the scope of the present invention to provide an improved process and apparatus for photographically enlarging and developing an image in which an enlarged image of a picture which may be a transparency, e.g., a negative, may be produced in a relatively short period of time, e.g., 2 minutes to a large magnification, e.g., 10×10, and which shall be capable of operation by relatively unskilled persons and shall be robust in use.

Such a process and apparatus has particular application for producing poster size enlargements of transparencies or negatives at an attractively economic cost.

According to one aspect of the present invention there is provided a process of photographically enlarging and developing an image in which unexposed light-sensitive material is advanced from a roll of such material to an image receiving location, exposed to an image at such location, the exposed material is severed from the roll and advanced through image activating or developing means and image stabilising means, characterised in that the material advanced to the image receiving location by feed rollers disposed downstream of such location is supported at such location in a substantially vertical plane by such feed rollers, the material at the image receiving location is exposed to an enlargement of the image to be reproduced and subsequently advanced from the image receiving location by said feed rollers and the exposed material is severed from the roll after advancement beyond the feed rollers.

Preferably, the exposed material is severed by the guillotine action of a knife edge displaced in a direction substantially normal to the general plane of the exposed material at the severing location.

According to another aspect of the invention there is provided apparatus for photographically enlarging and developing an image comprising means for advancing unexposed light sensitive material from a roll of such material to an image receiving location, means for exposing the material at such location to an image of the image to be reproduced, means for severing the exposed material from the roll and means for advancing the severed material through image activating or developing means and image stabilising means, characterised in that material advancing means comprises a pair of feed rollers disposed downstream of the image receiving location and operable to draw the material from the roll to the image receiving location, to support the material suspended therefrom in a substantially vertical plane during exposure of the material when at such location and to advance the material from such location after exposure, the means for exposing the material at such location comprises means for projecting an enlargement of the image to be reproduced on to the material at such location and the means for severing the exposed material is disposed downstream of the feed rollers and is operable to sever the exposed material after advancement beyond the feed rollers.

Preferably the severing means comprises a knife edge displaceable in a direction normal to the general plane of the material at the severing location to sever the exposed material by a guillotine action.

Conveniently, the means for projecting an enlargement of the image to be reproduced is operable to project at the image receiving location an enlargement of the order of 10×10.

With advantage, the means for advancing the severed material through image activating or developing means and image stabilising means comprises at least one set of transport rollers disposed downstream of the severing means and means is provided for driving the feed rollers and the transport rollers synchronously.

Desirably, means is provided responsive to interruption of drive to the feed rollers to actuate the severing means.

The apparatus preferably includes a light source for projecting the image to be reproduced together with a timing control circuit operable sequentially to switch on said light source, switch off said light source after a predetermined time interval, activate said feed rollers to advance the exposed material from said light receiving location and draw an unexposed part of said material to said location, de-activate said feed rollers, actuate said severing means, and advance said severed material through the image activating or developing means and the image stabilising means.

With advantage, the timing circuit includes a cam timer for controlling said predetermined time interval and a further cam timer for controlling the dwell time of the severed material in each of said image activating or developing means and the image stabilising means.

Desirably, the feed rollers are mounted on shafts carried at their ends in bearing blocks each formed with two elongate slots of equal width and extending in mutually perpendicular directions and each shaft having a diameter less than the width of the slots and sufficiently large to constrain the shaft to movement in the direction of length of the slot whereby the shafts are constrained to move in mutually perpendicular directions.

The severing means preferably comprises a knife edge displaceable in a direction normal to the general plane of the material at the severing location to sever the exposed material by a guillotine action.

With advantage, the knife edge is carried on a cutting member secured through spaced connecting rods to the armatures of two solenoids which, when energised displace the knife edge in a cutting stroke in said direction.

Conveniently, each connecting rod is slidably supported in a bearing block mounted on a base plate and a fixed cutting block is associated with the base plate and formed with a knife edge receiving slot arranged to receive the knife edge at the end of the cutting stroke.

BRIEF DESCRIPTION OF THE DRAWINGS

One embodiment of the invention will now be described by way of example, reference being made to the accompanying drawings in which.

DESCRIPTION OF PREFERRED EMBODIMENT

Figure 1:
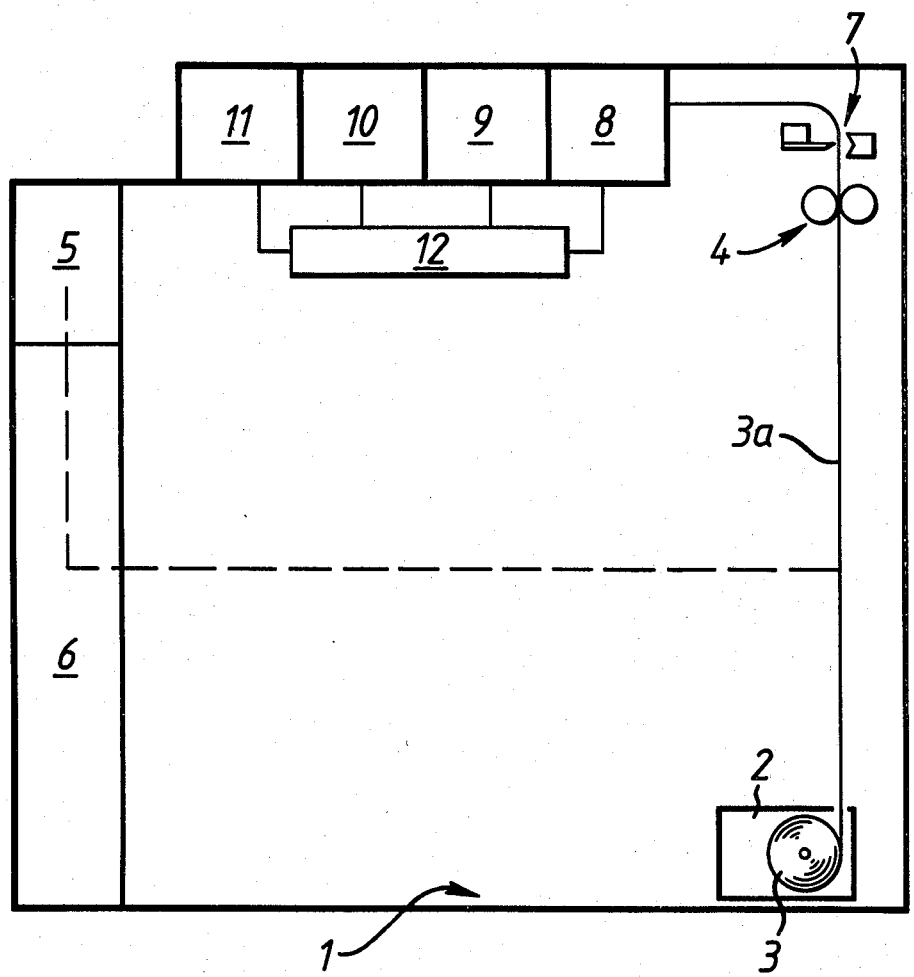
FIG. 1 is a schematic block diagram of a photographic enlarging and developing apparatus according to the invention.

The apparatus of the illustrated embodiment is a photographic enlarging and developing apparatus which comprises a light-tight housing 1 within which is disposed a light-tight enclosure or magazine 2 for storing a roll of light sensitive paper 3 which is drawn from the roll by a pair of rollers 4 spaced from the enclosure or magazine 2 by a predetermined distance and operable vertically to support a length of the paper 3a at an image receiving location. This predetermined distance is slightly greater than the length of the enlarged image to be produced. Means is provided for locating a transparency of the image to be enlarged, e.g., a photographic negative, together with a light source of adjustable intensity, an enlarging lens system and a reflex mirror. The locating means, light source and lens system are denoted by the reference 5 and the reflex mirror by the reference 6. The enlarged image is projected on to the length of paper 3a. Immediately downstream of the rollers 4 is located a solenoid operated guillotine assembly 7 which is followed by a processing unit incorporating a number of processing baths which in this example comprise an image activating or developing bath 8, an image stabilizing bath 9, an image fixing bath 10 and a washing bath 11. Each bath is supplied with its respective liquid through a pumping system 12 incorporating separate pumps for each liquid which are activated when the apparatus is switched on to pump the liquid to the bath and each bath has an overflow through which the pumped liquid overflows back to the source from which it is pumped so that the liquid does not stagnate in its bath and localised concentration of ingredients are avoided. Furthermore, the overflows function as siphons to empty the associated bath when the associated pump is switched off.

The processing unit includes transporting rollers (not shown) driven synchronously with the rollers 4 and at the same speed and which advance the paper through the processing unit, the length of the path of the paper through the respective baths being selected in relation to the speed of advance of the paper to ensure that the paper is exposed to the liquid in each bath for an optimum dwell period.

The operation of the apparatus so far described is briefly as follows:

Paper from the roll 3 is initially drawn through the image receiving location and engaged in the rollers 4 which support the length 3a in the image receiving location. The length 3a is supported in a substantially vertical plane under its own weight and is under tension because of such weight and the inertia of the roll 3. The light source is energised for a predetermined period of time to project the enlarged image of the negative on to the vertically supported length of paper 3a. The rollers 4 are then energised and operate to draw a further length of paper from the roll 2 whilst advancing the exposed length through the guillotine and into driven engagement with the transporting rollers of the processing unit. When a further length of unexposed paper has been drawn into the image receiving position, the drive to the rollers 4 ceases and the guillotine 7 is operated to sever the exposed length of paper from the succeeding unexposed length and to allow the exposed length to continue its passage through the processing unit to emerge as a developed, stabilised, fixed and washed enlargement of the original negative. The time required for the whole operation is less than two minutes.

The various sequences of operations are controlled in timed relationship by a control unit which incorporates an electrical control circuit and control cams which are started to open and close electrical contacts in the control circuit. A key mains on/off switch is provided together with a START push-button switch which initiates operation of the control cams to initiate an automatic sequence of operation which, once started cannot be interrupted due to a latching mechanism. However, to enable the sequence of operation to be controlled manually, five further pushbutton switches are provided and may be identified as EXPOSE, PROCESS (on/off), ADVANCE, CUT and STOP. The processor and pump system are available commercially as an AGFA-GEVAERT RAPIDOPRINT DD 2666 processor provided with an AGFA R 37 pump system. The control panel may include RIKON switches and the cam timer is available commercially through RS Components Limited.

Normally, the apparatus is programmed to perform automatically a complete sequence of events and it is then only necessary to switch on the key mains switch and press the START button to start the sequence. With the paper supported by the rollers 4 and its leading edge extending just above the guillotine assembly 7, and a negative inserted in the enlarger 5, a positive image is projected on to the surface of the length of paper 3a supported below the rollers 4 during the brief period of exposure. The feed rollers 4 advance the exposed material past the guillotine for engagement along the transport rollers which are operated in synchronism therewith. When the exposed length of paper is advanced past the guillotine 7 the feed rollers 4 and the transport rollers are deactivated and the guillotine is operated to sever the exposed length of paper from the unexposed length now is position 3a. The transport rollers are then activated to transport the exposed length of paper through the baths. The pumping system 12 operates continuously. The leading edge of the exposed and now developed length may be arranged to issue from the washing bath 11 at about the same time the next cutting action takes place. The rollers 4 and the transport rollers stop immediately before cutting takes place so that the cutting action is not impaired. After the cutting the transport rollers restart their rotation and, after the developed length has issued, these rollers are stopped by a signal denoting the end of the processing in the baths.

The paper used may be resin-coated RAPITONE paper sold by AGFA-GEVAERT and it is possible to produce, on insertion into the locating means 5 of a 57.15 mm×57.15 mm negative, a high quality enlarged photograph of poster size of 61 cms×51 cms in one minute 40 seconds. Changing the lens from a f 5.6/105 mm to f 2.8/50 mm, the apparatus is capable of producing the same size photograph from a 35 mm negative. Using a "recoverable negative" from the POLAROID camera, the same size photograph can be produced after removing the developing emulsions from the negative and inserting the negative into the enlarger.

The sequence of the complete cycle is as follows:

1. The key mains on/off switch which in this embodiment is in the form of a master key switch, must be switched on for two minutes prior to commencing an automatic programme. The reason being that upon the key switch being turned on, the four independent circuits of the pump system 12 immediately start to pump their respective chemical fluids to the processor baths which require this amount of time to receive the necessary level of fluid for the correct processing of the light-sensitive material. The pumps will then maintain that level continuously until the key switch is switched off. Each individual bath will then automatically syphon its contents back to its main reservoir bottle (not shown).

The key switch also energises a switching relay which opens the current supply circuits to all the other components of the control circuit via their respective switches some of which are latching, some of which are momentary. Each component is operable manually through its respective switch, namely the exposure lamp or bulb by the EXPOSE switch, the motor for the transporting rollers of the processor by the PROCESS (on/off) switch, the motor for activating the feed rollers 4 by the ADVANCE switch and the activating solenoids of the guillotine assembly, via a load absorbing relay, by the CUT switch. There is also an illuminated switch (not shown) which is illuminated for the whole of the time that the key switch is in the on position. This switch carries the legend "POWER and PUMPS ON".

2. To commence an automatic cycle after inserting the negative into the locating means 5, depressing the START switch will engage and activate the automatic cam timer control system, which supersedes all previously operable manual circuits, which will remain inoperable until the automatic cycle has completed, 1 minute 40 seconds later. The system then reverts to manual operation whilst the key switch is in the power on position, or until the START switch is depressed to commence a further automatic cycle.

3. The sequence which follows the depression of the START switch is totally controlled by the cam timer control, and is as follows:

The exposure light is energised for a period of 12 seconds before being switched off. The motor for the feed rollers 4 is then energised to start the advance of the exposed material past the guillotine to the baths, the motor for the transporting rollers is energised almost simultaneously with the motor for the rollers 4 so that the advancing exposed material is engaged.

The exposed material is now being advanced towards the baths at the speed of 1.75 cm per second and approximately 15 seconds after the start of the feed rollers 4 it will be entering the baths.

The exposed material continues to advance and, at this stage, it is engaged between both the feed rollers 4 and between the leading take up rollers of the transport rollers. The process continues, the leading edge of the material progressing farther into subsequent sets of transport rollers, of which there are 8 sets incorporated within the processor, until a signal from the cam timer stops the feed rollers 4. Within 2 seconds, the solenoids are energised, operating the guillotine 7 which then cuts the paper immediately above the rollers 4.

The cut or severed portion of material is now engaged progressively by the sequency of transport rollers within the processor, which guide it through the four bath process at the same constant speed of 1.75 cm per second, until the whole cut length of approximately 64 cms with a photographic image 61 cms×51 cms fixed permanently on its activated surface is ejected at the designed exit slot.

The complete cycle from depression of the START switch takes 1 minute 40 seconds.

The cam timer which has now completed its cycle is de-energised, the control panel switches now revert to manual operation if required until a further depression of the START switch repeats the cycle, which can be commenced immediately the previous cycle has completed.

At all times throughout the progress of an automatic cycle the progress of the cycle can be visually observed by the fact that as each stage of the process is taking place, the relevant switch on the control panel for each component is illuminated progressively as the various components are energised, the automatic cycle cannot be interrupted by inadvertent depression of any of the various switches whilst an automatic cycle is in progress.

Figure 2:
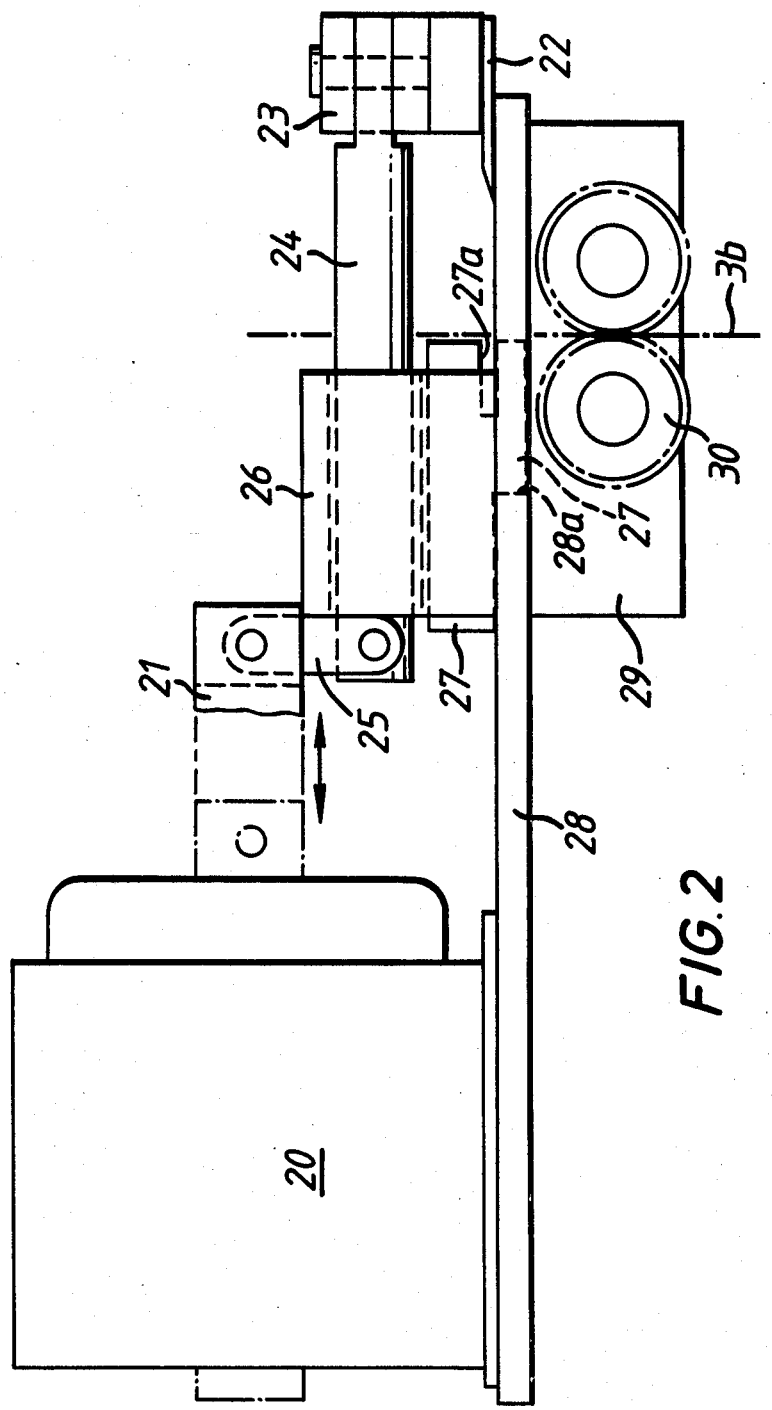
FIG. 2 is a side-elevational view illustrating a solenoid-operated guillotine assembly forming part of the apparatus of FIG. 1.
Figure 3:
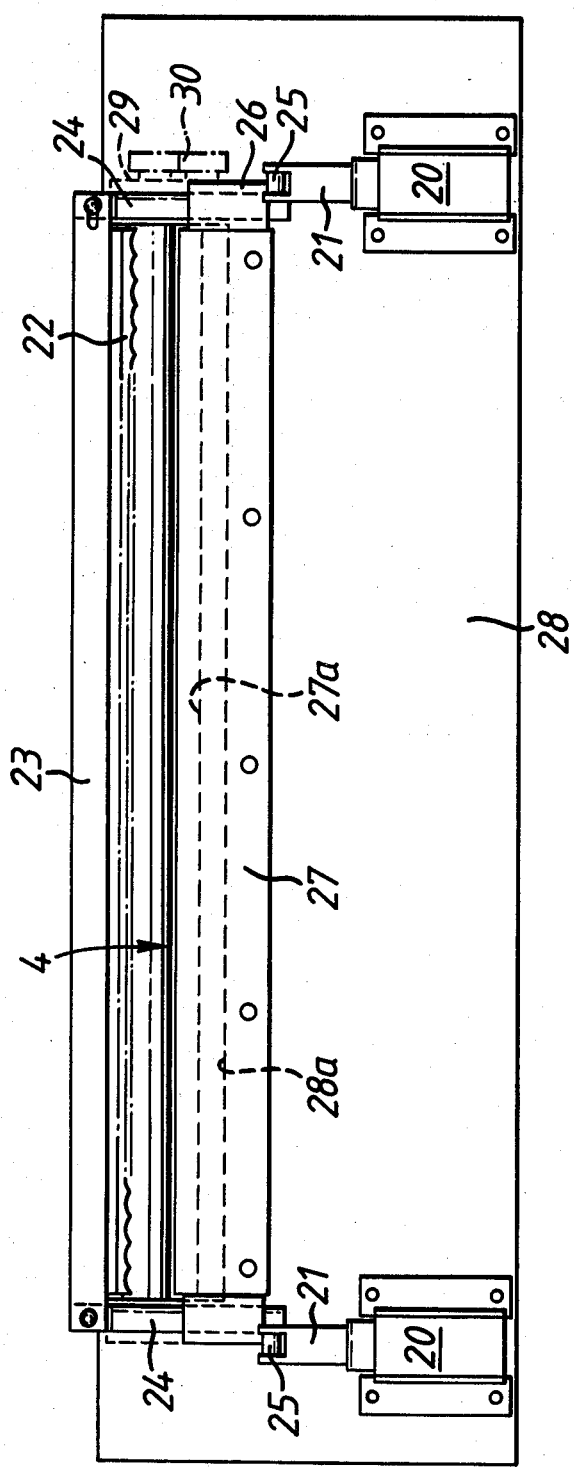
FIG. 3 is a plan view of the assembly shown in FIG. 2 to a smaller scale.

FIGS. 2 and 3 show the solenoid-operated guillotine assembly 7 in more detail. This assembly comprises a pair of spaced solenoids 20 each having an armature 21 extending therefrom for displacement to the left as seen in FIG. 2 when the associated solenoid is energised. Each armature 21 carries a depending drop link 25 secured to a separate connecting rod 24 and each connecting rod 24 is slidably supported and guided in a separate bearing block 26 secured to a base plate 28.

Between the bearing blocks 26 there extends a guillotine cutting block 27 which is also mounted on and secured to the base plate 28 being partly received in a slot 28a in the base plate 28 to bring a longitudinally extending knife-receiving slot 27a to the level of the upper face of the base plate 28. A blade bar 23 having bifurcated ends is secured by such ends to the spaced connecting rods 24 and carries on its lower face a cutting member or blade 22 which is detachably and replaceably secured thereto. Spring means (not shown) e.g., coil springs, is provided to bias the blade bar 23 away from the cutting block 27.

In FIG. 2 the feed rollers 4 are obscured by associated gear wheels 30 but it will be appreciated the paper indicated at 3b in chain dotted lines is advanced beyond the feed rollers 4 through the slot 28a in a substantially vertical plane and that the cutting edge of the blade 22 is advanced into the slot 27a in a direction substantially normal to this vertical plane. When the solenoids 20 are energised, the armatures 21 are displaced to the left as seen in FIG. 2 correspondingly to displace the blade bar 23 and the blade 22 and bring the cutting edge into the slot 27a. This is a powerful and almost instantaneous action which is very effective to sever the paper in a clean and effective manner.

It will be appreciated that instead of a base plate 28 formed with a slot 28a two separate spaced base plates 28 may be provided, each associated with a separate solenoid 20 and bearing block 26.

The gear wheels 30 are each associated with a separate one of the feed rollers 4 and are carried on the ends thereof so that one of the gear wheels 30 is driven by a suitable drive (not shown) and the other is driven by the driven gear wheel. The opposed ends of the feed rollers 4 are mounted in spaced roller bearing blocks 29 secured to the base plate 28 by bolts extending through bores 29a. One such bearing block 29 is illustrated in FIGS. 3 to 7.

Each bearing block 29 is formed with two elongate slots 31a and 31b of equal width but extending in mutually perpendicular directions, i.e., the slot 31a is vertical and the slot 31b is horizontal as shown in FIG. 3. Each roller 4 (FIG. 1) has a shaft 33 (shown in dotted outline in FIG. 3) whose diameter is just less than the width of the slot 31a and the height of the slot 31b so that the shafts are constrained to move in the mutually perpendicular directions. In practice, the axis of the driving roller mounted in the slot 31a would be fixed and the driven roller mounted in the slot 31b would be free to move a limited distance in the horizontal direction, e.g., to permit unjamming of paper or to allow for variations in paper thickness.

Figure 4:
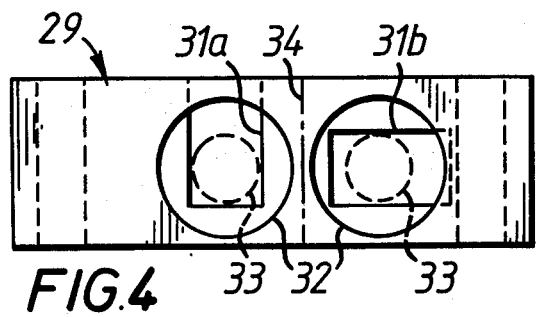
FIGS. 4 to 8 are front, front-perspective, side, rear-perspective and rear views, respectively, of a feed roller bearing block for use with the apparatus for FIGS. 1 to 3.
Figure 6:
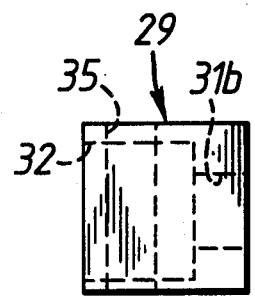
Figure 5:
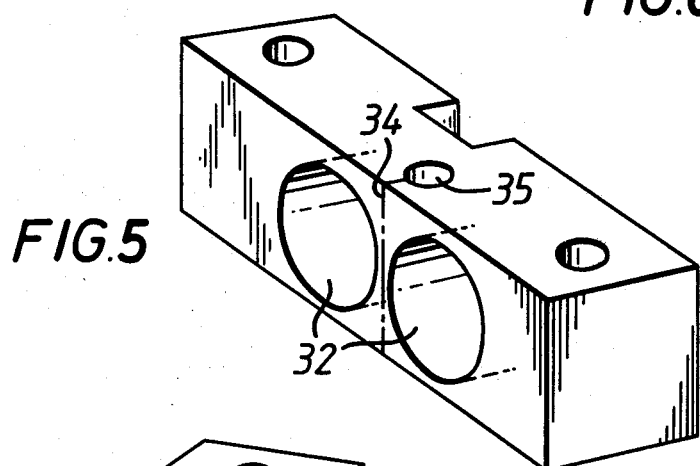
Figure 7:
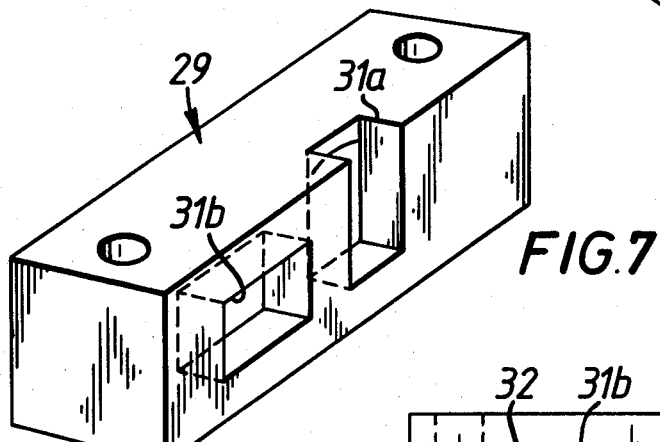
Figure 8:
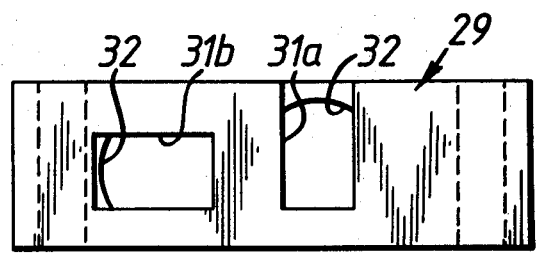

As shown in FIGS. 4 and 5, each bearing block 29 is formed with two blind circular holes 32 each communicating with a respective one of the slots 31a and 31b and formed on the opposite sides of the block to that in which the slots are formed. These holes 32 are arranged to loosely accommodate a portion of each roller shaft. It will be appreciated that the bearing blocks 29 may be "mirror images" of each other and be made from identical blanks prior to the slots and holes being formed. As described hereinafter, a hole 35 may be drilled parallel to a line 34 located symmetrically between the holes 32.

In operation the rollers 4 are driven continuously after exposure has occurred until a signal denoting the end of the processing in the baths is applied to the solenoid. The drive is then interrupted and the armature 21, link 25, connecting rod 24, blade bar 23 and blade 22 move against spring bias to the left as shown in FIG. 2, until the blade 22 enters the cutting block 27 and the end of the armature is in the closed position shown in FIG. 2. If desired, the blade 22 can be arranged to spring back as soon as it has entered the cutting block. It will be appreciated that the guillotine assembly described with reference to FIG. 2 is not limited to use with the photographic developing apparatus of FIG. 1 but could be used for cutting any suitable sheet material.

In a modification (not shown) the rollers 4 are not provided with gear wheels but are arranged so that one is arranged to drive the other by a belt drive such as a rubber or elastic band. The shaft may still be constrained to move in mutually perpendicular directions.

In a further modification, the two elongate slots 31a, 31b each receive a nylon bearing (not shown) having planar external surfaces which provide a sliding fit of the bearings into their respective slots. Each bearing has a centrol bore for receiving one end of a respective roller. The driven roller mounted in the slot 31b would still be free to move, together with its bearing, towards slot 31a.

Each nylon bearing is formed with a spacer portion having a pulley groove whose diameter is slightly less than the diameter of the rollers. The grooves accommodate a non-rotating rubber tension band which maintains frictional contact between the rollers.

Each roller comprises a rubber cylindrical section vulcanised onto the shaft 33, which may be a steel base shaft, which extends through the nylon bearing. Each vulcanised rubber section terminates adjacent a spacer portion so that the rubber sections are spaced from the faces of each bearing block by the spacer portions.

In the case of the driven roller, situated in the slots 31a the base shaft extends through the full width of the bearing block, protruding slightly on the other side. The base shaft of the non-driven roller in slots 31b is somewhat shorter and does not so protrude.

The ends of the driven roller shaft are keyed to receive a tight push-fit male portion of a universal drive coupling, which when pushed into the shaft has a reduced boss portion which recesses into the blind round hole 32 communicating with the slot 31a.

The female portion of the universal drive coupling is similarly mounted in the final drive shaft of a reduction gear box and slip-fits to couple with the male portion when assembled.

If desired, a boss of plastics material may be inserted into the blind hole communicating with the slot 31b. Prior to insertion of this boss, a hole 35 as shown in FIGS. 3 to 5 is drilled parallel to line 34. The hole 35 is of a diameter slightly greater than the distance between the holes 32 so that a passage is formed which connects the holes 32 inside the bearing block 29. If now the boss is inserted as described, the insertion of a tapered rod into the hole 35 will urge apart the boss and the reduced boss portion, and hence the rollers, against the tension of the rubber band. Suitably, the hole 35 is just over ¼" (6 mm) diameter, the spacing between the holes 32 is 4 mm and the rod is of ¼" diameter and has a tapered end of 1 inch length and ⅛" at its tip. In practice, the hole 35 would lie vertically below a similar hole (not shown) in the base 28 so that the rod can be inserted through this hole and hole 35.

If desired, the rod may incorporate a return spring. The rod and the hole 35 need not be of circular section and the hole 35 could have a longitudinal taper if desired.

If desired, the transporting rollers may include rollers located between and/or located in the baths and rollers located between the rollers 4 and the activating bath 8.

What is claimed is:

1. A process for photographically enlarging and developing an image which comprises drawing unexposed light-sensitive material under tension from a roll of such material to a substantially vertically disposed image receiving location by means of feed rollers located downstream of said location and engaged with said material to support and locate said unexposed material in tension at said location, exposing said unexposed material supported under tension at said location by said feed rollers to an enlargement of the image to be reproduced, driving said feed rollers to advance said exposed material beyond said feed rollers to draw a further length of unexposed material from said roll under tension to said location and locate and support said further length of unexposed material at said location, and severing said material advanced beyond said feed rollers downstream of said feed rollers whilst retaining said further length of material at said location supported and located under tension by engagement with said feed rollers.

2. A process according to claim 1 in which the material is severed by a knife edge displaced in a direction substantially normal to the general plane of the material at the substantially vertically disposed image receiving location.

3. Apparatus for photographically enlarging and developing an image comprising a light-tight housing, a light-tight enclosure within said housing for storing a roll of unexposed light sensitive material, means for projecting an enlargement of the image to be reproduced to a substantially vertically disposed image receiving location within said housing, a pair of feed rollers in said housing disposed downstream of said location operable to draw unexposed material from said roll under tension to said image receiving location and to support and locate said material suspended under tension at said location in a substantially vertical plane for exposure to said projected enlarged image and to advance exposed material from said location beyond said feed rollers after exposure and to present a further length of unexposed material at said location supported under tension, and severing means for severing the exposed material advanced beyond said feed rollers whilst maintaining said further length of material engaged and supported under tension by said feed rollers.

4. Apparatus according to claim 3 in which said severing means comprises a knife edge mounted for displacement in a direction substantially normal to said vertical plane.

5. Apparatus according to claim 3 in which said feed rollers comprise a driving roller and a driven roller and said driving roller is retained against displacement in said direction substantially normal to said vertical plane.

6. Apparatus for photographically enlarging and developing an image comprising a light-tight housing, a light-tight enclosure within said housing for storing a roll of unexposed light sensitive paper, means for projecting an enlargement of the image to be reproduced to a substantially vertically disposed image receiving location within said housing, a pair of feed rollers maintained in frictional contact and disposed in said housing downstream of said location, drive means for controllably driving one of said pair of feed rollers, means for transmitting the drive from said one feed roller to the other of said pair of feed rollers, said feed rollers being arranged to draw unexposed light sensitive material from said roll under tension and to locate and support said material suspended under tension at said location in a substantially vertical plane for exposure to said projected enlarged image and to advance exposed material from said location beyond said feed rollers after exposure and to present a further length of unexposed material at said location supported under tension, bearing means mounting said one roller against displacement in a direction normal to said vertical plane and severing means operable to sever exposed material advanced beyond said feed rollers and comprising a knife edge mounted for displacement in a direction substantially normal to said vertical plane to sever said advanced material as said further length of unexposed material is supported and located under tension at said location by engagement with said feed rollers.

7. Apparatus according to claim 6 in which means is provided responsive to interruption of drive to the feed rollers to actuate the severing means.

8. Apparatus according to claim 6 in which the feed rollers are mounted on shafts carried at their ends in bearing blocks each formed with two elongate slots of equal width and extending in mutually perpendicular directions and each shaft having a diameter less than the width of the slots and sufficiently large to constrain the shaft to movement in the direction of length of the slot whereby the shafts are constrained to move in mutually perpendicular directions.

9. Apparatus according to claim 6 characterised in that the knife edge is carried on a cutting member secured through spaced connecting rods to the armatures of two solenoids which, when energised displace the knife edge in a cutting stroke in said direction.

10. Apparatus according to claim 9 characterised in that each connecting rod is slidably supported in a bearing block mounted on a base plate and a fixed cutting block is associated with the base plate and formed with a knife edge receiving slot arranged to receive the knife edge at the end of the cutting stroke.

* * * * *